(12) United States Patent
Hsieh et al.

(10) Patent No.: US 10,162,172 B2
(45) Date of Patent: *Dec. 25, 2018

(54) OPTICAL LENS AND FIXTURE THEREOF

(71) Applicant: Genius Electronic Optical Co., Ltd., Taichung (TW)

(72) Inventors: Hung-Chien Hsieh, Taichung (TW); Jie-Sheng Hu, Fujian (CN); Zi-Wen Xu, Fujian (CN); Shen-Chieh Chen, Taichung (TW)

(73) Assignee: GENIUS OPTICAL (XIAMEN) CO., LTD., Fujian (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/172,158

(22) Filed: Jun. 3, 2016

(65) Prior Publication Data

US 2016/0299336 A1    Oct. 13, 2016

Related U.S. Application Data

(63) Continuation-in-part of application No. 14/515,547, filed on Oct. 16, 2014.

(30) Foreign Application Priority Data

Oct. 16, 2013  (CN) .......................... 2013 1 0483867
Apr. 22, 2016  (CN) .......................... 2016 1 0257155

(51) Int. Cl.
*G02B 1/11*   (2015.01)
*G02B 27/00*  (2006.01)
*G02B 7/02*   (2006.01)

(52) U.S. Cl.
CPC ............ *G02B 27/0018* (2013.01); *G02B 1/11* (2013.01); *G02B 7/021* (2013.01)

(58) Field of Classification Search
CPC ........... G02B 7/02; G02B 7/021; G02B 5/005
USPC ................................. 359/601–614, 738–740
See application file for complete search history.

(56) References Cited

U.S. PATENT DOCUMENTS

| 6,545,811 B1 * | 4/2003 | Fujimoto | G02B 3/0031 359/619 |
| 7,405,764 B2 * | 7/2008 | Gustavsson | G02B 13/0015 257/433 |
| 7,440,189 B2 * | 10/2008 | Imamura | G02B 3/0031 359/618 |
| 8,264,786 B2 * | 9/2012 | Lee | G02B 5/005 359/811 |
| 9,638,832 B1 * | 5/2017 | Su | G02B 1/11 |

(Continued)

FOREIGN PATENT DOCUMENTS

| CN | 1725038 | 1/2006 |
| CN | 101493563 | 7/2009 |

(Continued)

*Primary Examiner* — Nicholas R. Pasko
(74) *Attorney, Agent, or Firm* — JCIPRNET (57) ABSTRACT

An optical lens including a lens and at least one optical layer is provided. The lens has a central region and a peripheral region surrounding the central region. The at least one optical layer is disposed on the lens. Each optical layer is located in the peripheral region and exposes the central region, wherein the peripheral region has at least one first gap strip region connected to the central region, and each optical layer exposes the at least one first gap strip region. A fixture is also provided.

9 Claims, 11 Drawing Sheets

(56) References Cited

U.S. PATENT DOCUMENTS

2011/0176216 A1   7/2011  Kawauchi et al.
2012/0038975 A1*  2/2012  Khajurivala ........... G02B 1/105
                                                359/356

FOREIGN PATENT DOCUMENTS

| CN | 103314313 | 9/2013 |
| TW | 201000942 | 1/2010 |
| TW | 201207437 | 2/2012 |

* cited by examiner

OPTICAL LENS AND FIXTURE THEREOF

CROSS-REFERENCE TO RELATED APPLICATION

This application is a continuation-in-part application of and claims the priority benefit of U.S. prior application Ser. No. 14/515,547, filed on Oct. 16, 2014, now pending, which claims the priority benefit of China application Ser. No. 201310483867.2, filed on Oct. 16, 2013. This application also claims the priority benefit of China application Ser. No. 201610257155.2, filed on Apr. 22, 2016. The entirety of each of the above-mentioned patent applications is hereby incorporated by reference herein and made a part of this specification.

BACKGROUND OF THE INVENTION

Field of the Invention

The invention relates to an optical element and a fixture thereof, and particularly relates to an optical lens and a fixture thereof.

Description of Related Art

Specifications of portable electronic products change rapidly, and the optical lens assemblies serving as key components are also developed in diversified ways. Applications of the optical lens sets not only include image capturing and video recording, but also include environment monitoring, driving data recording, etc., and along with progress of image sensing technology, consumers have higher demand on imaging quality.

In order to enhance image quality of the optical lens assemblies (for example, improving the stray light issue), sometimes it needs to make improvements with regard to optical performance (such as transmittance or reflectance) of a specific region (such as a peripheral region) of the optical lens. For example, in the prior art, a light shielding element is often used for shielding an edge of the optical lens (i.e., reducing transmittance of the peripheral region) to filter stray light formed due to reflection or refraction occurring at the edge of the optical lens, such that negative impact on imaging quality owning to stray light is reduced. However, the optical lens disposed with the light shielding element not only is hard to keep a better assembly accuracy, but also has an issue affecting imaging quality due to poor assembly. Hence, how to make improvements with regard to optical performance of the specific region of the optical lens under a condition of maintaining ideal assembly accuracy has always been a concern of industry, government, and academia.

SUMMARY OF THE INVENTION

The invention provides an optical lens, which is capable of making improvements with regard to optical performance of the peripheral region under a condition of maintaining ideal assembly accuracy.

The invention provides a fixture for manufacturing aforesaid optical lens.

An embodiment of the invention provides an optical lens including a lens and at least one optical layer. The lens has a central region and a peripheral region surrounding the central region. The at least one optical layer is disposed on the lens. Each optical layer is located in the peripheral region and exposes the central region, wherein the peripheral region has at least one first gap strip region connected to the central region, and each optical layer exposes the at least one first gap strip region.

In an embodiment of the invention, a point connecting each first gap strip region and the central region is defined as a first connecting point. A straight line passing through the first connecting point from a center of the lens along a radial direction is defined as a first radius line. An angle between orthogonal projections of each first gap strip region and the first radius line on a reference plane which is vertical to an optical axis direction of the optical lens is within a range of 30 degrees to 60 degrees.

In an embodiment of the invention, each first gap strip region is connected between the central region and a peripheral edge of the lens.

In an embodiment of the invention, the peripheral region further has at least one second gap strip region not connected to the central region, and each optical layer further exposes the at least one second gap strip region.

In an embodiment of the invention, each first gap strip region is connected between the central region and a peripheral edge of the lens. Each second gap strip region is connected to the peripheral edge of the lens.

An embodiment of the invention provides a fixture, which is adapted to fix the lens of the optical lens during a process of manufacturing aforesaid optical lens. The fixture includes a carrier plate, a shielding plate, and at least one first connecting portion. The carrier plate has at least one opening. The shielding plate is located in the opening and shields the central region of the lens. The at least one first connecting portion connects the carrier plate and the shielding plate, wherein the at least one first connecting portion supports the peripheral region of the lens and shields the at least one first gap strip region.

In an embodiment of the invention, a point connecting each first connecting portion and the shielding plate is defined as a second connecting point. A straight line passing through the second connecting point from a center of the shielding plate along a radial direction is defined as a second radius line. An angle between orthogonal projections of each first connecting portion and the second radius line on a reference plane which is vertical to an optical axis direction of the optical lens is within a range of 30 degrees to 60 degrees.

In an embodiment of the invention, an inner radius of the carrier plate is larger than a diameter of the lens.

In an embodiment of the invention, the fixture further includes at least one second connecting portion. The at least one second connecting portion is located in the opening, connected to the carrier plate, and not connected to the shielding plate, where the at least one second connecting portion supports the peripheral region of the lens and defines at least one second gap strip region not connected to the central region in the peripheral region.

Based on the above, advantageous effects of the optical lens according to the embodiments of the invention are as follows. In the optical lens, the optical layer is directly formed on the lens. Therefore, compared to additionally disposing a light shielding element outside the lens, the optical lens is capable of making improvements with regard to optical performance of the peripheral region under a condition of maintaining ideal assembly accuracy. Moreover, by appropriately designing the connecting portion (such as the first connecting portion or the second connecting portion) of the fixture for manufacturing aforesaid optical lens, not only the coverage rate of the at least one optical layer may be enhanced, but also the process yield may be enhanced, and the falling issue caused by the lens being subject to vibration during the coating process may be improved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
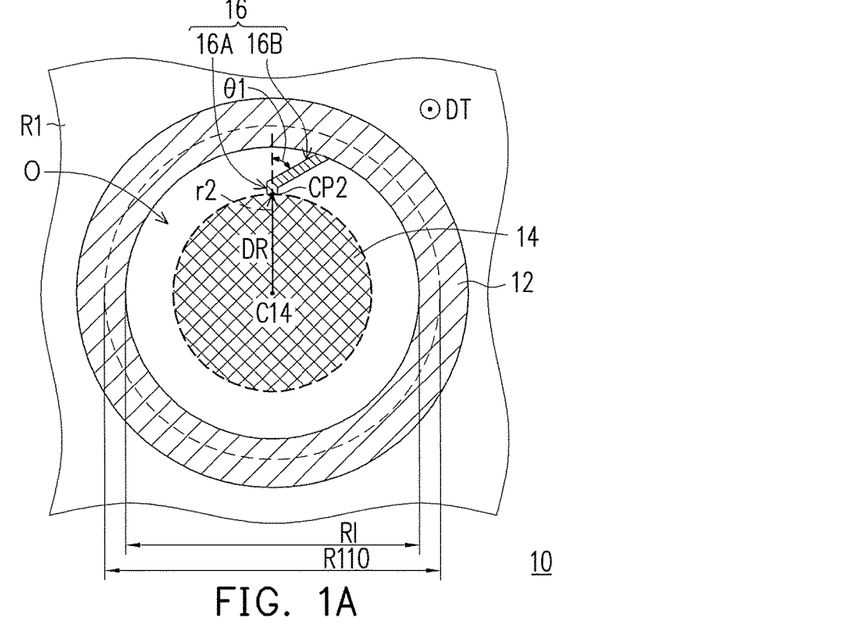
FIG. 1A is a top schematic view illustrating a fixture according to a first embodiment of the invention.
Figure 1B:
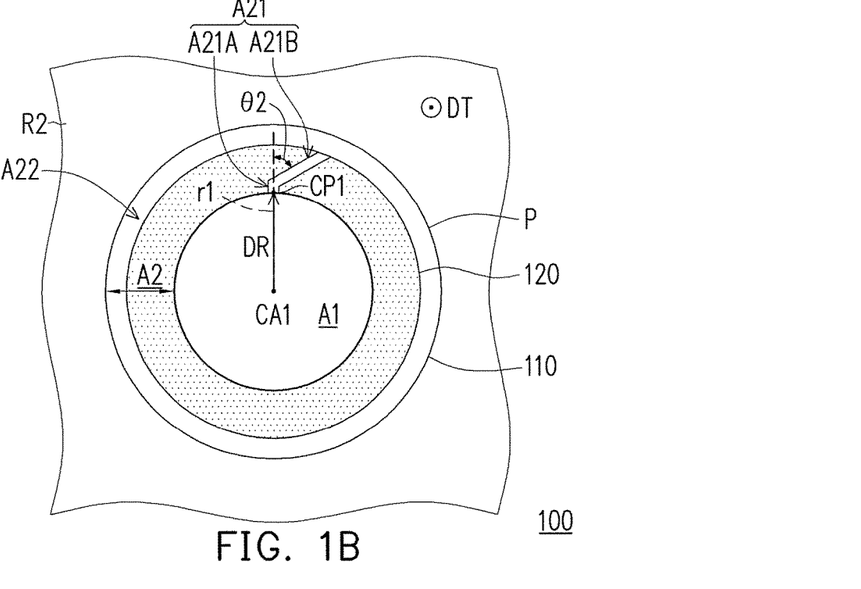
FIG. 1B is a top schematic view illustrating an optical lens according to the first embodiment of the invention.
Figure 1C:
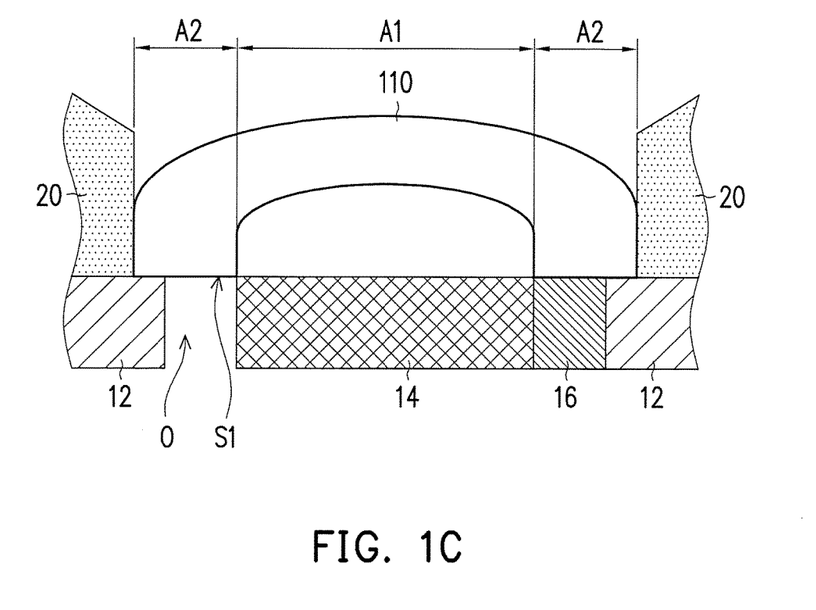
FIG. 1C is a cross-sectional schematic view illustrating the fixture of FIG. 1A and the optical lens of FIG. 1B after they are assembled together.
Figure 2A:
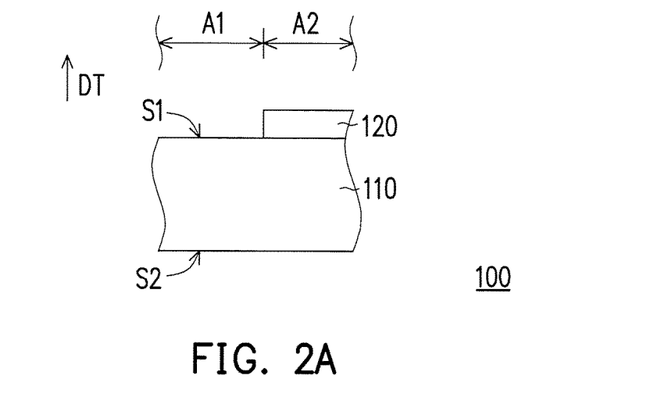
FIG. 2A to FIG. 2C are a first-type to a third-type schematic cross-sectional view along a section line A-A' in FIG. 1B.
Figure 2B:
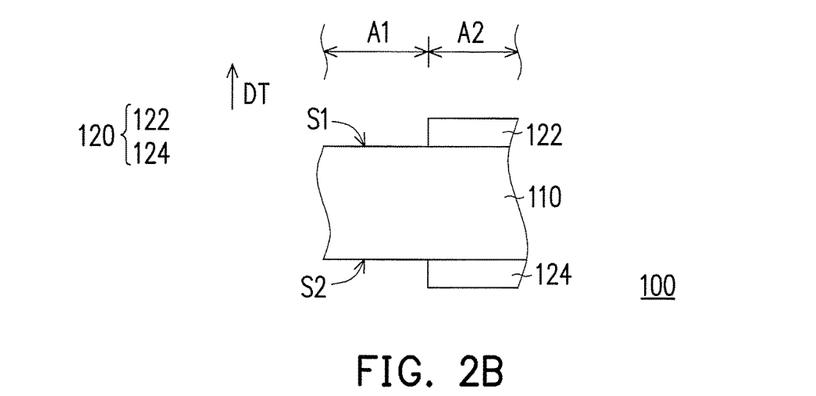
Figure 2C:
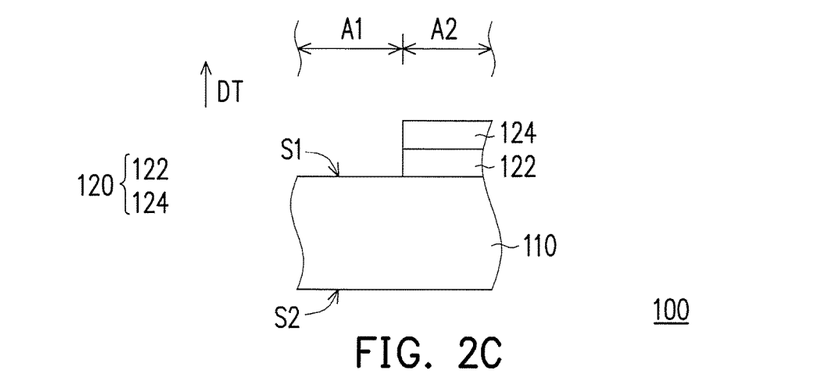

FIG. 1A is a top schematic view illustrating a fixture according to a first embodiment of the invention. FIG. 1B is a top schematic view illustrating an optical lens according to the first embodiment of the invention. FIG. 1C is a cross-sectional schematic view illustrating the fixture of FIG. 1A and the optical lens of FIG. 1B after they are assembled together. FIG. 2A to FIG. 2C are a first-type to a third-type schematic cross-sectional view along a section line A-A' in FIG. 1B. In FIG. 1A, for the convenience of describing the relative relationship between the fixture and the optical lens, the thin dashed line is marked as an edge of the lens, and the thick dashed line is marked as a boundary between a central region and a peripheral region of the lens. A region inside the thick dashed line is corresponding to the central region of the lens. A region outside the thick dashed line and inside the thin dashed line is corresponding to the peripheral region of the lens.

Referring to FIG. 1B, an optical lens 100 includes a lens 110 and at least one optical layer 120. The lens 110 has refractive power, and the lens 110 may be a spherical lens or an aspherical lens. The lens 110 has a central region A1 and a peripheral region A2 surrounding the central region A1 (the thick solid line in FIG. 1B is marked as the boundary between the central region A1 and the peripheral region A2). The central region A1 is defined as an optical effective radius region which is adapted to allow light beams to pass through. A diameter of the central region A1 is the clear aperture of the lens 110, and a range of diameter tolerance is approximately 0.2 mm to 0.6 mm.

The at least one optical layer 120 is disposed on the lens 110. Each optical layer 120 is located in the peripheral region A2 and exposes the central region A1. A material of the at least one optical layer 120 may be different based on different requirements. For example, if transmittance of the peripheral region A2 is needed to be reduced, then a material of the at least one optical layer 120 may include $Ti_xO_y$, or $Cr_xO_y$, where x and y are respectively larger than zero, and $(x+y)\leq 1$. On the other hand, if reflectance of the peripheral region A2 is needed to be reduced, then the at least one optical layer 120 may be a multilayer film. The multilayer film may be formed of at least one high-refractive index layer and at least one low-refractive index layer which are stacked alternatively. Accordingly, reflectance of the peripheral region A2 is reduced by satisfying conditions of destructive interference, so as to achieve the effect of anti-reflection (i.e., effect for reducing reflectance). For example, a material of the high-refractive index layer may include $Ti_xO_y$, or $Cr_xO_y$, where x and y are respectively larger than zero, and $(x+y)\leq 1$. A material of the low-refractive index layer may include silicon dioxide or silicon oxide, but the invention is not limited thereto.

In one embodiment, as shown in FIG. 2A, a number of the at least one optical layer 120 may be one, and the optical layer 120 is disposed on one of the surfaces S1 and S2 of the lens 110, where one of the surfaces S1 and S2 is an object-side surface, and the other one is an image-side surface. Or, as shown in FIG. 2B, the number of the optical layer 120 may be two. In detail, the at least one optical layer 120 may include a first optical layer 122 and a second optical layer 124. The first optical layer 122 and the second optical layer 124 are overlapped, and the first optical layer 122 and the second optical layer 124 are respectively disposed on two opposing surfaces S1 and S2 of the lens 110. One of the surfaces S1 and S2 is the object-side surface, and the other one is the image-side surface. Alternatively, as shown in FIG. 2C, the first optical layer 122 and the second optical layer 124 may be disposed on a same surface (such as surface S1) of the lens 110. It should be mentioned that the number, the thickness, the material or the relative arrangement relationship of the at least one optical layer 120 can be altered based on design requirements, and the invention is not limited thereto.

The at least one optical layer 120 may have other types of embodiments according to different fixtures 10 for manufacturing the optical lens 100. The optical lens 100 of FIG. 1B is, for example, made by the use of a coating process. During the coating process, the lens 110 of the optical lens 100 is fixed by the fixture 10 in FIG. 1A for forming the at least one optical layer 120 in the peripheral region A2 of the lens 110.

The fixture 10 may include a carrier plate 12, a shielding plate 14 and at least one first connecting portion 16. The carrier plate 12 may be used for supporting the lens 110, and a material of the carrier plate 12 is, for example, stainless steel or metal. However, the invention is not limited thereto. The carrier plate 12 has at least one opening O. One opening O is illustrated schematically in FIG. 1A, but the invention is not limited thereto.

The shielding plate 14 is located in the opening O and shields the central region A1 of the lens 110. In this way, during the coating process, the coating material (such as the material of the at least one optical layer 120) may be prevented from being formed on the central region A1, and the at least one optical layer 120 expose the central region A1 after the end of the coating process. A material of the shielding plate 14 is, for example, stainless steel or metal, but the invention is not limited thereto.

The at least one first connecting portion 16 connects the carrier plate 12 and the shielding plate 14, and the at least one first connecting portion 16 is adapted to support the peripheral region A2 of the lens 110. A material of the at least one first connecting portion 16 is, for example, stainless steel or metal, but the invention is not limited thereto. In the present embodiment, the carrier plate 12, the shielding plate 14 and the at least one first connecting portion 16 may be located on the same horizontal plane (as shown in FIG. 1C). However, based on different design requirements, the carrier plate 12 and the shielding plate 14 may be located on different horizontal planes, and the at least one first connecting portion 16 is connected between the horizontal plane of the carrier plate 12 and the horizontal plane of the shielding plate 14.

During the coating process, the coating material is formed on the surface S1 of the lens 110 facing the fixture 10. Not only the shielding plate 14 but also the at least one first connecting portion 16 shields the coating material. Therefore, in the optical lens 100 formed with the help of the fixture 10, the at least one optical layer 120 not only exposes the central region A1, but also exposes the region shielded by the at least one first connecting portion 16. In detail, at least one first gap strip region A21 is formed in the peripheral region A2 corresponding to the at least one first connecting portion 16. The at least one first gap strip region A21 is connected to the central region A1, and the at least one first gap strip region A21 is connected between the central region A1 and a peripheral edge P of the lens 110. The at least one optical layer 120 further exposes the at least one first gap strip region A21.

In the present embodiment, the number of the at least one first connecting portion 16 is one. A point connecting each first connecting portion 16 and the shielding plate 14 is defined as a second connecting point CP2. A straight line passing through the second connecting point CP2 from a center C14 of the shielding plate 14 along a radial direction DR is defined as a second radius line r2. An angle θ1 between orthogonal projections of each first connecting portion 16 and the second radius line r2 on a reference plane R1 which is vertical to an optical axis direction DT of the optical lens 100 is within a range of 30 degrees to 60 degrees. As shown in FIG. 1A, the first connecting portion 16 may include a plurality of first sub connecting portions (such as first sub connecting portions 16A and 16B) being serially connected to each other. The first sub connecting portion 16A is connected between the second connecting point CP2 and the first sub connecting portion 16B, and an angle between the first sub connecting portion 16B and the second radius line r2 is, for example, equal to the angle θ1.

The number of the at least one first gap strip region A21 is also one. A point connecting each first gap strip region A21 and the central region A1 is defined as a first connecting point CP1. A straight line passing through the first connecting point CP1 from a center CA1 of the lens 110 along a radial direction (same as the radial direction DR of the shielding plate 14) is defined as a first radius line r1. An angle θ2 between orthogonal projections of each first gap strip region A21 and the first radius line r1 on a reference plane R2 which is vertical to the optical axis direction DT is within a range of 30 degrees to 60 degrees. The first gap strip region A21 may include a plurality of first sub regions (such as first sub regions A21A and A21B) being serially connected to each other, where a shape and a position of the first sub region A21A are corresponding to the first sub connecting portion 16A, and a shape and a position of the first sub region A21B are corresponding to the first sub connecting portion 16B. The aforesaid conditions of shape corresponding may include a condition that the shapes are the same or similar to each other and the sizes are the same or similar to each other. The first sub region A21A is connected between the first connecting point CP1 and the first sub region A21B, and an angle between the first sub region A21B and the first radius line r1 is, for example, equal to the angle θ2.

Under the above structure, the covering rate of the at least one optical layer 120 covering the peripheral region A2 is ideal. Therefore, it may improve stray light issue preferably. It should be mentioned that the carrier plate 12 may also support the edge of the lens 110 during the coating process under a condition that an inner diameter RI of the carrier plate 12 (i.e., a diameter of the opening O) is less than the diameter R110 of the lens 110. In this way, the stability of the support is enhanced, and damage of the first connecting portion 16 caused by excessive force may be reduced. Therefore, the process yield may be enhanced. It is noted that the peripheral region A2 of the lens 110 further has a circular gap region A22 because the edge of the lens 110 is shielded by the carrier plate 12 during the coating process. The circular gap region A22 is the region shielded by the carrier plate 12 during the coating process. The at least one optical layer 120 further exposes the circular gap region A22. In an optical imaging lens using the optical lens 100, the circular gap region A22 may be shielded by other elements (such as clamping mechanism) of the optical imaging lens. Therefore, the stray light issue is avoided.

It should be mentioned that a size of the circular gap region A22 is different according to the diameter R110 of the lens 110, thus the invention is not limited to those illustrated in FIG. 1B. If the inner radius RI of the carrier plate 12 is larger than or equal to the diameter R110 of the lens 110, the peripheral region A2 of the lens 110 may not have the circular gap region A22 (referring to the optical lens 100 in FIG. 3B, FIG. 4B, FIG. 5B, FIG. 6B and FIG. 7B). In comparison with the design having the circular gap region A22, a design that the at least one optical layer 120 covers the peripheral region A2 has a better covering rate. Therefore, it has a better optical imaging quality. In the present embodiment, as shown in FIG. 1C, the carrier plate 12 may further have a fixed wall structure 20 which laterally fixes the lens 110 and defines the opening O for assisting in fixing the lens 110. Thus, the lens 110 may be prevented from dropping or displacing due to being subject to vibration. It should be mentioned that the carrier plate 12, the shielding plate 14 and the at least one first connecting portion 16 may be formed in one piece, but the invention is not limited thereto. In another embodiment, each of the above-mentioned elements may be manufactured separately and then assembled together. Under the structure, each of the above-mentioned elements may use the same material or different materials.

Figure 3A:
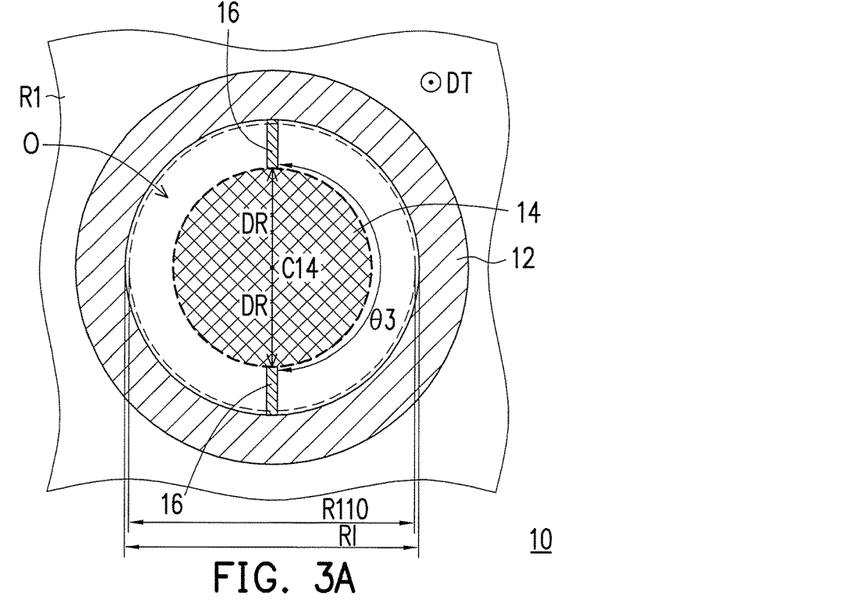
FIG. 3A is a top schematic view illustrating a fixture according to a second embodiment of the invention.
Figure 5A:
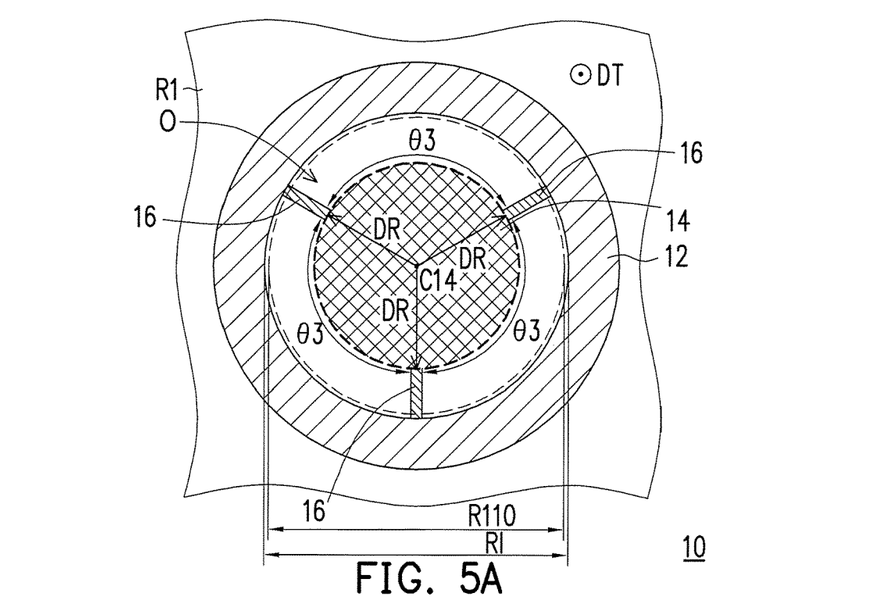
FIG. 5A is a top schematic view illustrating a fixture according to a fourth embodiment of the invention.
Figure 5B:
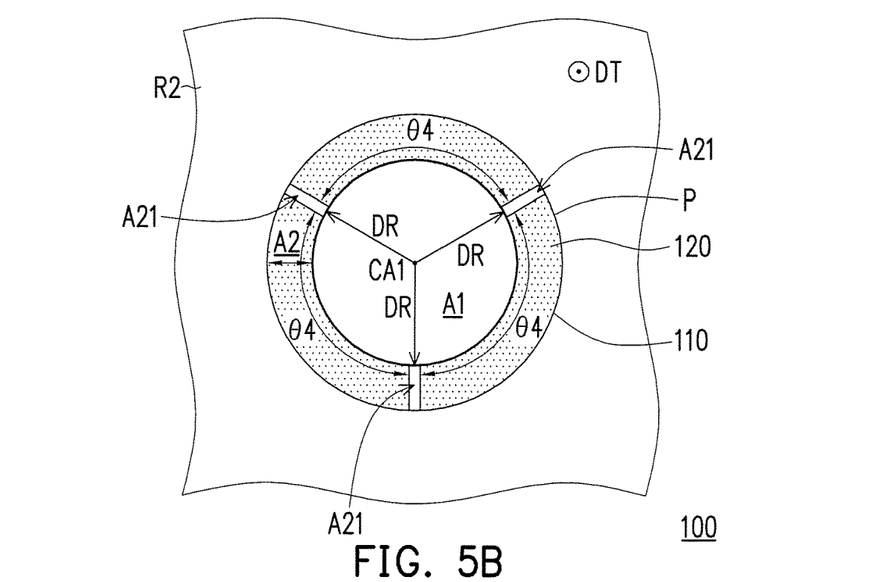
FIG. 5B is a top schematic view illustrating an optical lens according to the fourth embodiment of the invention.
Figure 5C:
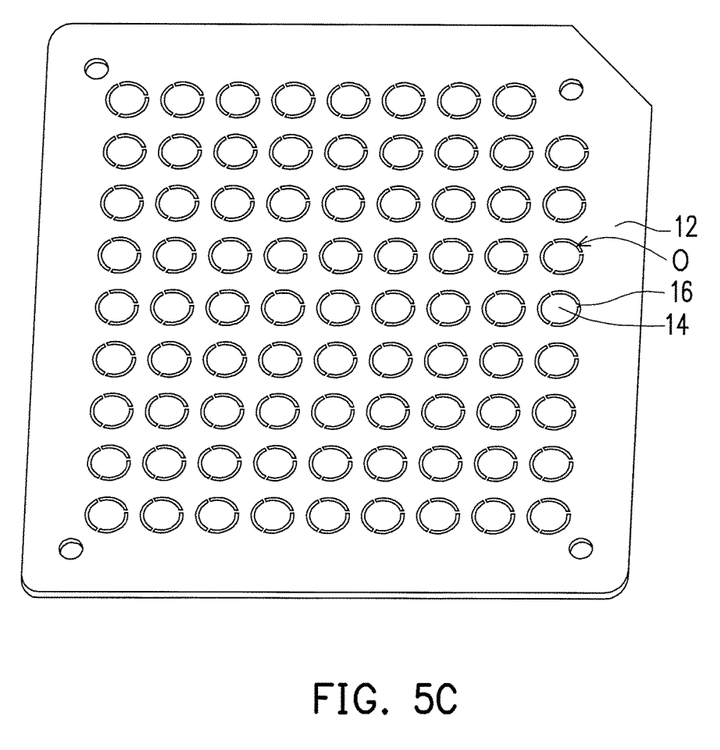
FIG. 5C is another schematic view illustrating a fixture according to the fourth embodiment of the invention.
Figure 5D:
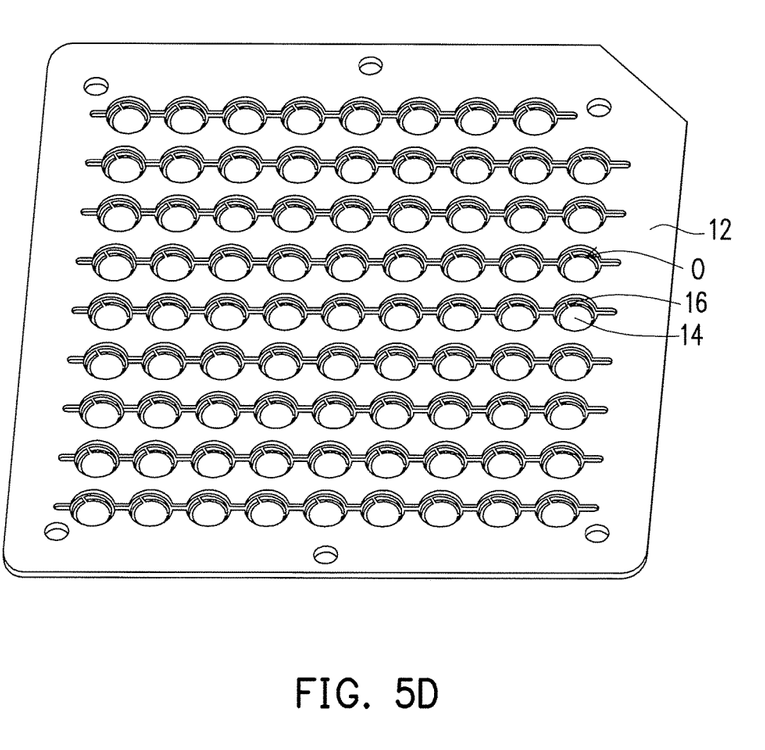
FIG. 5D is yet another schematic view illustrating a fixture according to the fourth embodiment of the invention.
Figure 6A:
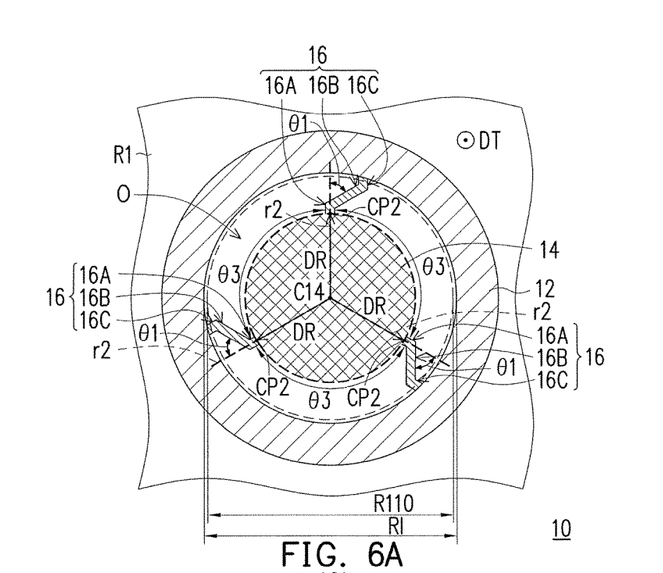
FIG. 6A is a top schematic view illustrating a fixture according to a fifth embodiment of the invention.
Figure 6B:
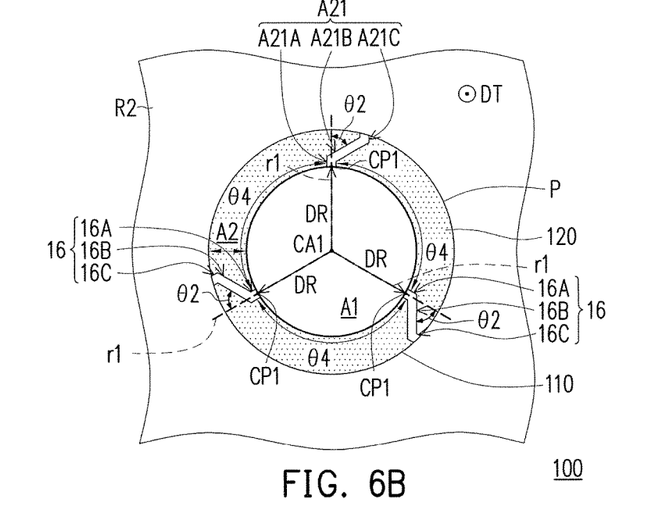
FIG. 6B is a top schematic view illustrating an optical lens according to the fifth embodiment of the invention.
Figure 7A:
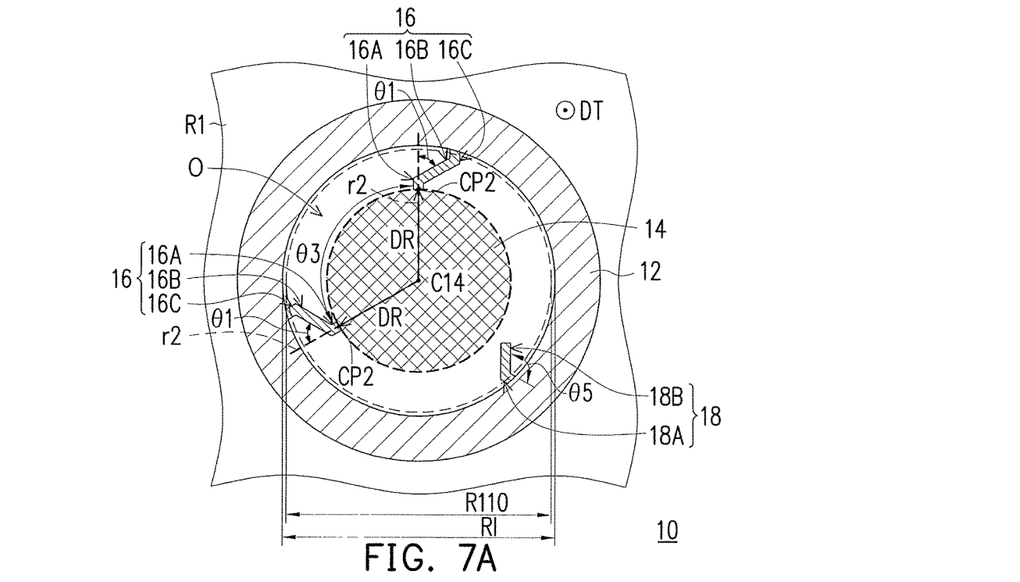
FIG. 7A is a top schematic view illustrating a fixture according to a sixth embodiment of the invention.
Figure 7B:
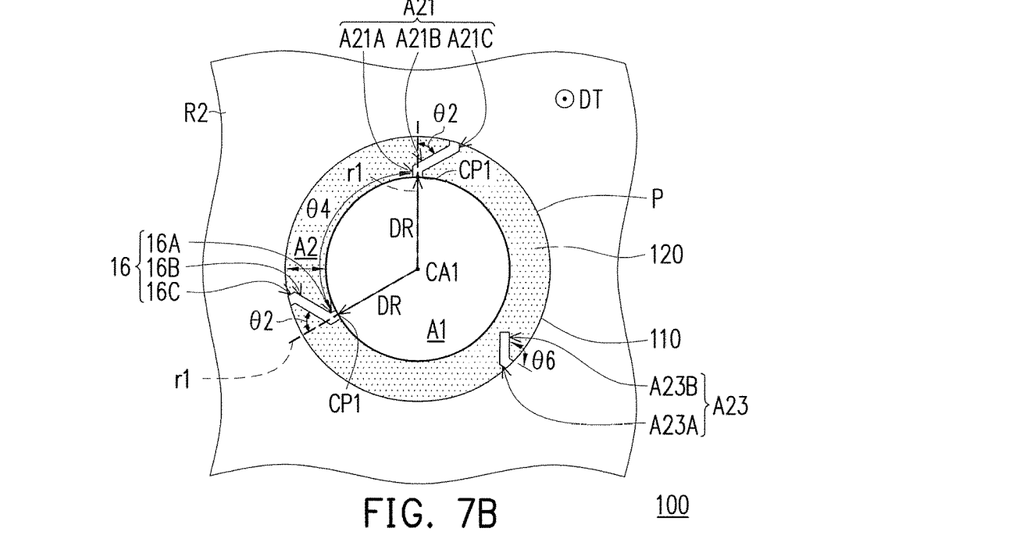
FIG. 7B is a top schematic view illustrating an optical lens according to the sixth embodiment of the invention.

The following paragraphs will explain other types of optical lenses and corresponding fixtures thereof in collaboration with FIG. 3A to FIG. 7B. FIG. 3A is a top schematic view illustrating a fixture according to a second embodiment of the invention. FIG. 3B is a top schematic view illustrating an optical lens according to the second embodiment of the invention. FIG. 3C is a cross-sectional schematic view illustrating the fixture of FIG. 3A and the optical lens of FIG. 3B after they are assembled together. FIG. 4A is a top schematic view illustrating a fixture according to a third embodiment of the invention. FIG. 4B is a top schematic view illustrating an optical lens according to the third embodiment of the invention. FIG. 5A is a top schematic view illustrating a fixture according to a fourth embodiment of the invention. FIG. 5B is a top schematic view illustrating an optical lens according to the fourth embodiment of the invention. FIG. 5C is another schematic view illustrating a fixture according to the fourth embodiment of the invention. FIG. 5D is yet another schematic view illustrating a fixture according to the fourth embodiment of the invention. FIG. 6A is a top schematic view illustrating a fixture according to a fifth embodiment of the invention. FIG. 6B is a top schematic view illustrating an optical lens according to the fifth embodiment of the invention. FIG. 7A is a top schematic view illustrating a fixture according to a sixth embodiment of the invention. FIG. 7B is a top schematic view illustrating an optical lens according to the sixth embodiment of the invention.

In the following embodiments, while illustrating the fixtures in FIG. 3A, FIG. 4A, FIG. 5A, FIG. 6A, and FIG. 7A, only the main differences between the fixtures thereof and the fixture in FIG. 1A will be illustrated. The similar or the same elements and the related descriptions in different embodiments may refer to the corresponding contents corresponding to FIG. 1A and FIG. 1C, thus the related descriptions thereof are not repeated hereinafter. Moreover, while illustrating the optical lens in FIG. 3B, FIG. 4B, FIG. 5B, FIG. 6B, and FIG. 7B, only the main differences between the optical lenses thereof and the optical lens in FIG. 1B will be illustrated. The similar or the same elements and the related descriptions in different embodiments may refer to the corresponding contents corresponding to FIG. 1B, thus the related descriptions thereof are not repeated hereinafter.

Figure 3B:
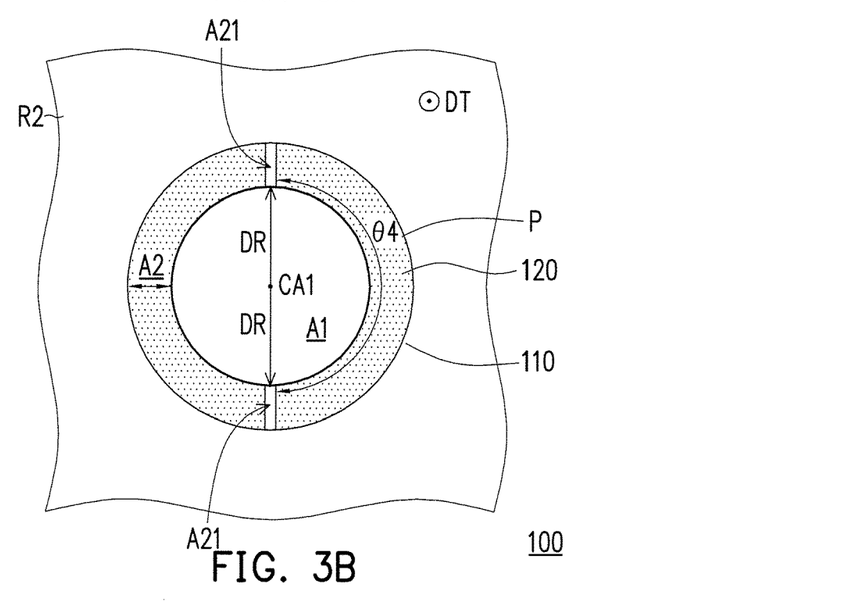
FIG. 3B is a top schematic view illustrating an optical lens according to the second embodiment of the invention.

Referring to FIG. 3A and FIG. 3B, in the fixture 10 of FIG. 3A, the number of the at least one first connecting portion 16 is two, and a shape of each of the first connecting portions 16 is straight strip shape. An orthogonal projection of each of the first connecting portions 16 on the reference plane R1 extends, for example, along a radial direction DR of the shielding plate 14, and an angle θ3 between the orthogonal projections of the first connecting portions 16 on the reference plane R1 is, for example, 180 degrees.

In the optical lens 100 of FIG. 3B, the number of the at least one first gap strip region A21 is also two, and a shape of each of the first gap strip regions A21 is straight strip shape. An orthogonal projection of each of the first gap strip regions A21 on the reference plane R2 extends, for example, along a radial direction of the central region A1 (same as the radial direction DR of the shielding plate 14), and an angle θ4 between the orthogonal projections of the first gap strip regions A21 on the reference plane R2 is, for example, 180 degrees.

Under the above structure, the fixture 10 may support the lens 110 more steadily, and damage of the first connecting portion 16 caused by excessive force may be reduced. Therefore, the process yield may be enhanced.

Figure 3C:
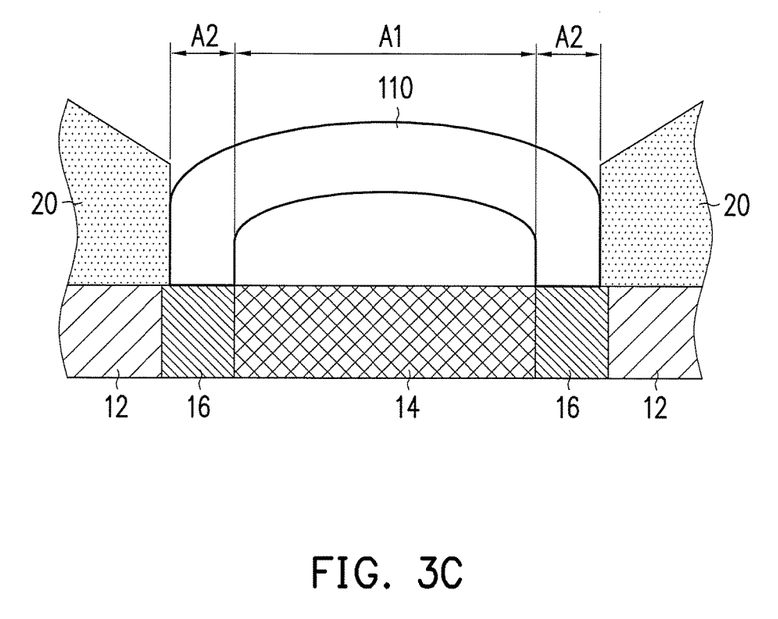
FIG. 3C is a cross-sectional schematic view illustrating the fixture of FIG. 3A and the optical lens of FIG. 3B after they are assembled together.

It should be mentioned that the lens 110 is mainly supported by the first connecting portions 16 (as shown in FIG. 3C) under a situation that the inner diameter RI of the carrier plate 12 is larger than the diameter R110 of the lens 110. The peripheral region A2 of the lens 110 does not have the circular gap region A22 as shown in FIG. 1B (as shown in FIG. 3B). However, in another embodiment, the inner radius RI of the carrier plate 12 may be less than the diameter R110 of the lens 110 for improving the supporting stability and reducing damage of the first connecting portion 16 caused by excessive force. Under this structure, the peripheral region A2 of the lens 110 has the circular gap region A22. The improvement is applied to the following embodiments, and thus related descriptions thereof are not repeated hereinafter. Moreover, in the present embodiment, the carrier plate 12, the shielding plate 14 and the at least one first connecting portion 16 are illustrated as being located on the same horizontal plane (as shown in FIG. 3C). However, based on different design requirement, the carrier plate 12 and the shielding plate 14 may be located on different horizontal planes, and the first connecting portion 16 is connected between the horizontal plane of the carrier plate 12 and the horizontal plane of the shielding plate 14. The improvement is applied to the following embodiments, and thus related descriptions thereof are not repeated hereinafter.

Figure 4A:
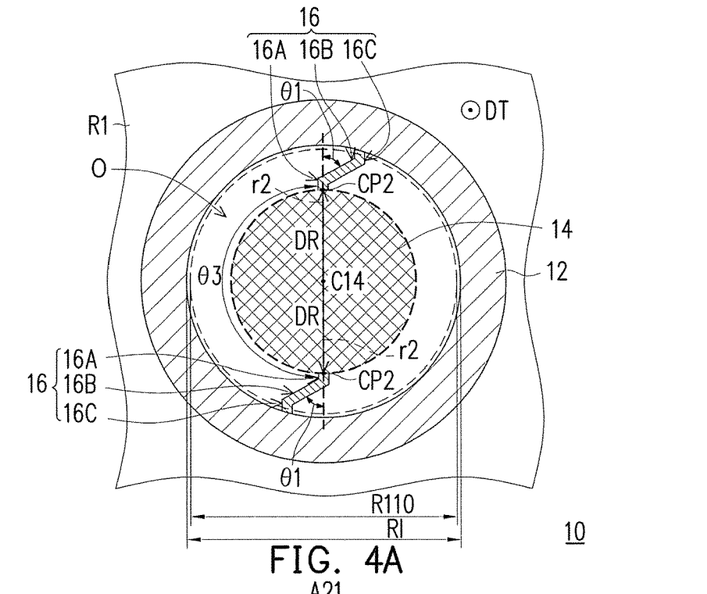
FIG. 4A is a top schematic view illustrating a fixture according to a third embodiment of the invention.
Figure 4B:
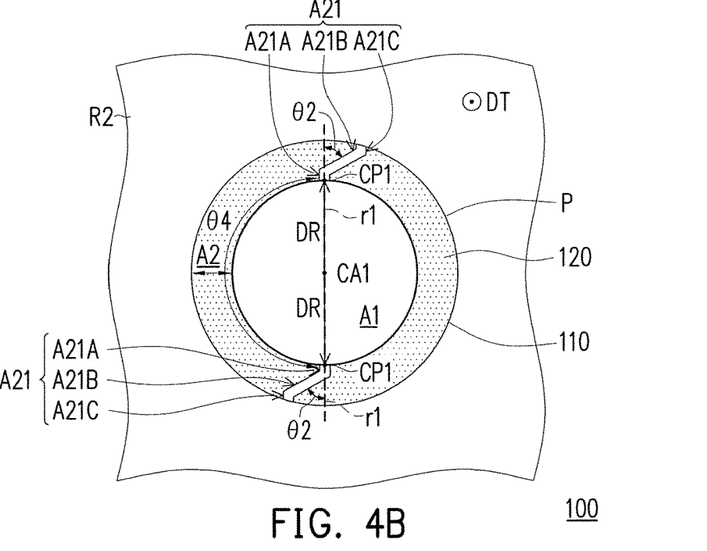
FIG. 4B is a top schematic view illustrating an optical lens according to the third embodiment of the invention.

Referring to FIG. 4A and FIG. 4B, in the fixture 10 of FIG. 4A, the number of the at least one first connecting portion 16 is two. Each of the first connecting portions 16 not only includes the first sub connecting portions 16A and 16B, but also includes a first sub connecting portion 16C, where the first sub connecting portion 16B is connected between the first sub connecting portion 16A and the first sub connecting portion 16C. Besides, an angle θ3 (which is also an angle between the orthogonal projections of the first sub connecting portions 16A on the reference plane R1) between the orthogonal projections of the first connecting portions 16 on the reference plane R1 is, for example, 180 degrees.

In the optical lens 100 of FIG. 4B, the number of the at least one first gap strip region A21 is also two. Each of the first gap strip regions A21 not only includes the first sub regions A21A and A21B, but also includes a first sub region A21C, where the first sub region A21C is corresponding to the first sub connecting portion 16C, and the first sub region A21B is connected between the first sub region A21A and the first sub region A21C. Besides, an angle θ4 (which is also an angle between the orthogonal projections of the first sub regions A21A on the reference plane R2) between the orthogonal projections of the first gap strip regions A21 on the reference plane R2 is, for example, 180 degrees.

Under the above structure, the fixture 10 may support the lens 110 more steadily, and damage of the first connecting portion 16 caused by excessive force may be reduced. Therefore, the process yield may be enhanced. Besides, with an appropriate design of angle θ1, the falling issue caused by the lens 110 being subject to vibration is reduced.

Referring to FIG. 5A and FIG. 5B, in the fixture 10 of FIG. 5A, the number of the at least one first connecting portion 16 is three, and a shape of the each of the first connecting portions 16 is straight strip shape. An orthogonal projection of each of the first connecting portions 16 on the reference plane R1 extends, for example, along a radial direction DR of the shielding plate 14, and an angle θ3 between the orthogonal projections of the first connecting portions 16 on the reference plane R1 is, for example, 120 degrees.

In the optical lens 100 of FIG. 5B, the number of the at least one first gap strip region A21 is also three, and a shape of each the first gap strip region A21 is straight strip shape. An orthogonal projection of each of the first gap strip regions A21 on the reference plane R2 extends, for example, along a radial direction of the central region A1 (same as the radial direction DR of the shielding plate 14), and an angle θ4 between the orthogonal projections of the first gap strip region A21 on the reference plane R2 is, for example, 120 degrees.

Under the above structure, the fixture 10 may support the lens 110 more steadily, and damage of the first connecting portion 16 caused by excessive force may be reduced. Therefore, the process yield may be enhanced. Besides, in comparison with designing a specific θ1 to improve the falling issue caused by the lens 110 being subject to vibration in FIG. 4A, increasing the number of the first connecting portions 16 in FIG. 5A may also improve the falling issue caused by the lens 110 being subject to vibration, and the improvement in FIG. 5A is better than the improvement in FIG. 4A.

Referring to FIG. 5C and FIG. 5D, the difference between the fixtures 10 of FIG. 5C and FIG. 5D and the fixture 10 of FIG. 5A is that the carrier plates 12 of FIG. 5C and FIG. 5D respectively have a plurality of openings O, and each of the openings O is disposed with one shielding plate 14. In the embodiment of FIG. 5C, the carrier plate 12, the shielding plate 14 and the at least one first connecting portion 16 may be located on the same horizontal plane. In the embodiment of FIG. 5D, the carrier plate 12 and the shielding plate 14 may be located on different horizontal planes, and the first connecting portion 16 is connected between the horizontal plane of the carrier plate 12 and the horizontal plane of the shielding plate 14. It should be mentioned that the improvement of the openings O is applied to each of the embodiments in the invention.

Referring to FIG. 6A and FIG. 6B, in the fixture 10 of FIG. 6A, the number of the at least one first connecting portion 16 is three. Each of the first connecting portions 16 not only includes the first sub connecting portions 16A and 16B, but also includes a first sub connecting portion 16C, where the first sub connecting portion 16B is connected between the first sub connecting portion 16A and the first sub connecting portion 16C. Besides, an angle θ3 (which is also an angle between the orthogonal projections of the first sub connecting portions 16A on the reference plane R1) between the orthogonal projections of the first connecting portions 16 on the reference plane R1 is, for example, 120 degrees.

In the optical lens 100 of FIG. 6B, the number of the at least one first gap strip region A21 is also three. Each of the first gap strip region A21 not only includes the first sub regions A21A and A21B, but also includes a first sub region A21C, where the first sub region A21C is corresponding to the first sub connecting portion 16C, and the first sub region A21B is connected between the first sub region A21A and the first sub region A21C. Besides, an angle θ4 (which is also an angle between the orthogonal projections of the first sub regions A21A on the reference plane R2) between the orthogonal projections of the first gap strip regions A21 on the reference plane R2 is, for example, 120 degrees.

Under the above structure, the fixture 10 may support the lens 110 more steadily, and damage of the first connecting portion 16 caused by excessive force may be reduced. Therefore, the process yield may be enhanced. Besides, the fixture 10 may improve the falling issue caused by the lens 110 being subject to vibration. Furthermore, in comparison with the design in FIG. 5B, the multi-section design of the first gap strip region A21 in FIG. 6B is contributed to reduce stray light passing through the peripheral region A2 of the lens 110 via the first gap strip region A21. Therefore, stray light with specific angles may be suppressed, and image quality of the optical imaging lens using the optical lens 100 may be improved.

Referring to FIG. 7A and FIG. 7B, in the fixture 10 of FIG. 7A, the number of the at least one first connecting portion 16 is two. Each of the first connecting portions 16 not only includes the first sub connecting portions 16A and 16B, but also includes a first sub connecting portion 16C, where the first sub connecting portion 16B is connected between the first sub connecting portion 16A and the first sub connecting portion 16C. Besides, an angle θ3 (which is also an angle between the orthogonal projections of the first sub connecting portions 16A on the reference plane R1) between the orthogonal projections of the first connecting portions 16 on the reference plane R1 is, for example, 120 degrees.

In the optical lens 100 of FIG. 7B, the number of the at least one first gap strip region A21 is also two. Each of the first gap strip regions A21 not only includes the first sub regions A21A and A21B, but also includes a first sub region A21C, where the first sub region A21C is corresponding to the first sub connecting portion 16C, and the first sub region A21B is connected between the first sub region A21A and the first sub region A21C. Besides, an angle θ4 (which is also an angle between the orthogonal projections of the first sub regions A21A on the reference plane R2) between the orthogonal projections of the first gap strip regions A21 on the reference plane R2 is, for example, 120 degrees.

The fixture 10 further includes at least one second connecting portion 18 located in the opening O. The at least one second connecting portion 18 is connected to the carrier plate 12 and is not connected to the shielding plate 14. The at least one second connecting portion 18 is adapted to support the peripheral region A2 of the lens 110 and defines at least one second gap strip region A23 which is not connected to the central region A1 in the peripheral region A2. In detail, during the coating process, not only the shielding plate 14 and the at least one first connecting portion 16 but also the at least one second connecting portion 18 shields the coating material. Therefore, in the optical lens 100 fanned with the help of the fixture 10, the at least one optical layer 120 not only exposes the central region A1 and the region shielded by the at least one first connecting portion 16, but also exposes the region shielded by the at least one second connecting portion 18. In detail, at least one second gap strip region A23 is formed in the peripheral region A2 corresponding to the at least one second connecting portion 18. The at least one second gap strip region A23 is connected to the peripheral edge P of the lens 110 and is not connected to the central region A1. The at least one optical layer 120 further exposes the at least one second gap strip region A23 respectively.

In the present embodiment, the number of the at least one second connecting portion 18 is one. The second connecting portion 18 may include a plurality of second sub connecting portions (such as second sub connecting portions 18A and 18B) being serially connected to each other. An angle θ5 between the orthogonal projections of two interconnected second sub connecting portions 18A and 18B on the reference plane R1 which is vertical to the optical axis direction DT of the optical lens 100 is, for example, within a range of 120 degrees to 150 degrees.

The number of the at least one second gap strip region A23 is also one. The second gap strip region A23 may include a plurality of second sub regions (such as second sub regions A23A and A23B) being serially connected to each other, where a shape and a position of the second sub region A23A are corresponding to the second sub connecting portion 18A, and a shape and a position of the second sub region A23B are corresponding to the second sub connecting portion 18B. An angle θ6 between the orthogonal projections of two interconnected second sub regions A23A and A23B on the reference plane R2 which is vertical to the optical axis direction DT of the optical lens 100 is, for example, within a range of 120 degrees to 150 degrees.

Under the above structure, the fixture 10 may support the lens 110 more steadily, and damage of the first connecting portion 16 caused by excessive force may be reduced. Therefore, the process yield may be enhanced. Besides, the fixture 10 may improve the falling issue caused by the lens 110 being subject to vibration. Moreover, in comparison with the design in FIG. 6B, the second gap strip region A23 and multi-section design thereof in FIG. 7B are contributed to further reduce stray light with specific angles. Furthermore, the covering rate of the at least one light optical layer 120 covering the peripheral region A2 is increased with respect to FIG. 6B, such that the image quality is better.

Based on the above, advantageous effects of the optical lens according to the embodiments of the invention are as follows. In the optical lens, the optical layer is directly formed on the lens. Therefore, compared to additionally disposing a light shielding element outside the lens, the optical lens is capable of making improvements with regard to optical performance of the peripheral region under a condition of maintaining ideal assembly accuracy. Moreover, by appropriately designing the connecting portion (such as the first connecting portion or the second connecting portion) of the fixture for manufacturing aforesaid optical lens, not only the coverage rate of the at least one optical layer may be enhanced, but also the process yield may be enhanced, and the falling issue caused by the lens being subject to vibration during the coating process may be improved.

Although the invention has been disclosed with reference to the aforesaid embodiments, they are not intended to limit the invention. It will be apparent to one of ordinary skill in the art that modifications and variations to the described embodiments may be made without departing from the spirit and the scope of the invention. Accordingly, the scope of the invention will be defined by the attached claims and not by the above detailed descriptions.

What is claimed is:

1. An optical lens, comprising:
   a lens, having an object-side surface and an image-side surface, and both of the object-side surface and the image-side surface having a central region and a peripheral region surrounding the central region; and
   at least one optical layer, disposed on one of the object-side surface and the image-side surface of the lens, the at least one optical layer located in the peripheral region and exposing the central region, wherein the peripheral region has at least one first gap strip region connected to the central region, and the at least one optical layer exposes the at least one first gap strip region,
   wherein a point connecting the at least one first gap strip region and the central region is defined as a first connecting point, a straight line passing through the first connecting point from a center of the lens along a radial direction is defined as a first radius line, an angle between orthogonal projections of the at least one first gap strip region and the first radius line on a reference plane which is vertical to an optical axis direction of the optical lens is within a range of 30 degrees to 60 degrees.

2. The optical lens according to claim 1, wherein the at least one first gap strip region is connected between the central region and a peripheral edge of the lens.

3. The optical lens according to claim 1, wherein a shape of the at least one first gap strip region is straight strip shape.

4. The optical lens according to claim 1, wherein the peripheral region further has at least one second gap strip region not connected to the central region, and the at least one optical layer further exposes the at least one second gap strip region, the at least one optical layer separates the at least one first gap strip region and the at least one second gap strip region, wherein the at least one first gap strip region passes through an entire width of the at least one optical layer from the peripheral region to the central region, and the at least one second gap strip region passes through a portion less than the entire width of the at least one optical layer from the peripheral region.

5. The optical lens according to claim 4, wherein the at least one first gap strip region is connected between the central region and a peripheral edge of the lens, the at least one second gap strip region is connected to the peripheral edge of the lens.

6. A fixture, adapted to fix the lens of the optical lens during a process of manufacturing the optical lens as claimed in claim 1, the fixture comprises:
   a carrier plate, having at least one opening;
   a shielding plate, located in the opening and shielding the central region of the lens; and
   at least one first connecting portion, connecting the carrier plate and the shielding plate, wherein the at least one first connecting portion supports the peripheral region of the lens and shields the at least one first gap strip region,
   wherein a point connecting the at least one first connecting portion and the shielding plate is defined as a second connecting point, a straight line passing through the second connecting point from a center of the shielding plate along a radial direction is defined as a second radius line, an angle between orthogonal projections of the at least one first connecting portion and the second radius line on a reference plane which is vertical to an optical axis direction of the optical lens is within a range of 30 degrees to 60 degrees.

7. The fixture according to claim 6, wherein an inner radius of the carrier plate is larger than a diameter of the lens.

8. The fixture according to claim 6, further comprises:
   at least one second connecting portion, located in the opening, connected to the carrier plate, and not connected to the shielding plate, wherein the at least one second connecting portion supports the peripheral region of the lens and defines at least one second gap strip region not connected to the central region in the peripheral region.

9. The fixture according to claim 6, wherein a shape of the at least one first connecting portion is straight strip shape.

* * * * *